Dec. 27, 1938. C. A. PERSONS 2,141,446
BICYCLE PEDAL
Filed March 24, 1937
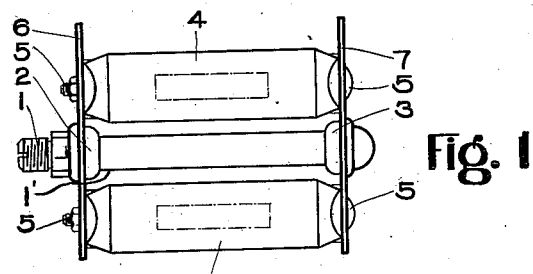
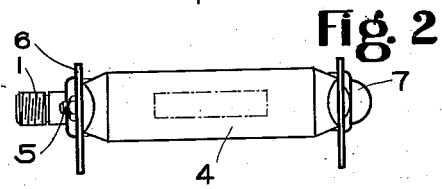
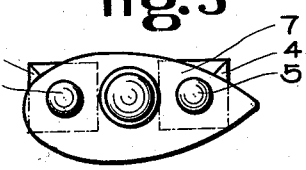
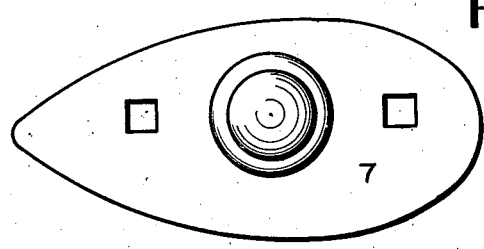
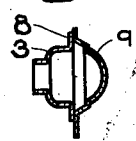
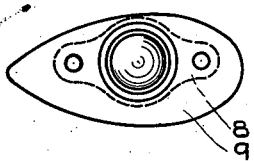
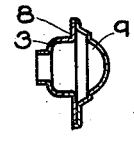
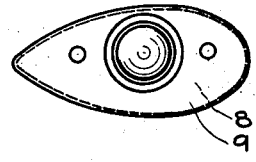
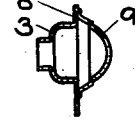
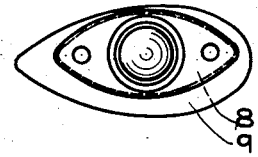
Charles A. Persons
INVENTOR Patented Dec. 27, 1938

2,141,446

UNITED STATES PATENT OFFICE 2,141,446

BICYCLE PEDAL

Charles A. Persons, Worcester, Mass., assignor to Persons-Majestic Mfg. Company, Worcester, Mass., a corporation of Massachusetts Application March 24, 1937, Serial No. 132,682

1 Claim. (Cl. 74—594.5)

In pedals for cycles and kindred machines it is the regular practice to dispose the parts in equal size and weight about the axis. Thus in the most popular designs there are, in one pedal, in addition to the spindle assembly, two rubber treads, two metal tread supporting pins, and two or four nuts. These parts are supported by cross-plates, one at each end of the pedal. The cross plates are symmetrically designed and the embossment or opening for the bearings is centrally located. Thus the parts are all in approximate balance, and if the pedal is spun about its axle it is as likely to come to rest with its treads vertical, as horizontal. It is a constant source of annoyance to a rider when mounting a bicycle to find that the pedal is in other than the horizontal position. To overcome this is one of the objects of the present invention.

In this improved pedal the field of design of the cross-plates is not limited to balanced or geometric designs but may include "stream-lined" outlines, and other designs which are best displayed in certain relative positions to the horizontal. The object of this invention has been attained with a great increase in the useful life of the pedal treads over the life of treads in other attempts to meet this condition. This will be more clearly understood upon reference to the drawing, in which:

Figs. 1, 2, and 3 illustrate a bicycle pedal embodying this invention in plan, front, and side views respectively.

Fig. 4 illustrates one form of cross plate as embodied in the invention.

Figs. 5 and 6 illustrate in sectional elevation and end view respectively a conventional cross-plate and an offset dust cap in their relative assembled positions.

Figs. 7 and 8 illustrate in sectional elevation and end view respectively a cross-plate and dust cap both of which are offset in relation to the bearing centers, the dust cap having a peripheral flange which closely fits the cross-plate.

Figs. 9 and 10 illustrate in sectional elevation and end view respectively a cross-plate of the conventional type and an offset dust cap, the dust cap having a stepped portion adapted to receive the periphery of the cross-plate.

The cross-plates may be formed with any desirable outline but either one or both are attached with the center of the pedal bearing offset from the center of weight of the cross-plate in such a manner that the pedal will always be returned to a horizontal position when the bicycle is left standing, or, if the cycle is being trundled and the cranks revolve, the pedals remain in a horizontal position ready for instant mounting by the rider.

As shown in Figs. 1, 2, and 3 the pedal is composed of the usual parts, a spindle 1, a set of ball-bearings near each end of the spindle contained in the ball cups, 2 and 3, a sleeve 1' which surrounds the spindle and holds the ball cups in spaced relation, treads 4 disposed at opposite sides of said spindle, tread supporting pins 5, which may be headed at one end or may be attached with nuts at both ends. The treads 4 are supported by the cross-plates 6 and 7, (Fig. 1), inner and outer respectively, which may be separate from the ball cups, or the plates 8, (Fig. 5), may be integrally formed with either or both of the ball cups. As shown in the drawing the cross-plates, 6 and 7, are attached in such relation to the pedal bearings that the pedal is appropriately unbalanced in relation to the design or outline of the cross-plate, so that when free to revolve the pedal will always come to rest in the same position with the design top side up. By this method the pedal can also be designed for any desirable tilt and it will always be returned to the same position in relation to the horizontal.

This improvement is further adapted to be used with pedal assemblies which include dust caps 9. If the cross-plate is mounted conventionally, the weight of the dust cap will be offset in relation to the center of the pedal bearings, as shown in Figs. 5, 6, 9, and 10, the dust cap being of any desirable outline. To obtain a more complete sealing against the elements, the dust cap may be formed with a flange which closely encircles the periphery of the cross-plate, Figs. 7 to 10. The dust caps 9 shown in the drawing represent a type for use at the outer end of a pedal, but in some assemblies a modified type is used at the inner end, to which the same principles apply.

As the most rapidly wearing surfaces of a pedal are the treads it is desirable to have them uniform so that all sides may be used before they are replaced. This pedal represents an improvement over other attempts to attain this object, in that the treads 4 may be turned to a new surface when one is worn smooth, giving several times the normal useful life as that of pedals which are maintained in the desired position by enlarging one side of the treads.

I am aware that bicycle pedals have previously been made to assume always a predetermined horizontal position by the application of additional elements to the conventional pedal structure, these additional elements being in the form of weights which extend downwardly from the pedal and inevitably increase the total weight thereof. In certain instances the weighting of the pedal by a balancing element attached to the pedal has been for the purpose of holding the pedal in a proper position for the rider to engage his toe with a toe clip on the pedal, since, without the extra balancing structure, the toe clip would put the pedal out of balance and the pedal would always be in an up-side-down position. In contrast to these known structures, the present invention provides for causing the pedal to assume a predetermined position relative to the horizontal by unbalancing one of the component or essential parts of the pedal structure.

From the foregoing it will be apparent that the present invention involves a bicycle pedal which comprises a spindle having bearings adjacent the opposite ends thereof on which a pedal structure is journalled. The pedal structure comprises a pair of end plates which are journalled on the bearings, means connecting the end plates and supporting a pair of treads which extend between and are secured to the opposite end plates, being positioned on opposite sides of the spindle to be substantially in balance relative to the spindle. The end plates are held in spaced relation by a sleeve and at least one of the elements of the rotatable pedal structure, that is the end plates, the sleeve, or a dust cap positioned on and connected to one of the end plates, has its center of gravity offset from the axis of the spindle to such an extent that, when the pedal structure is free to rotate on the spindle, the offset weight of the unbalanced element will cause the pedal structure to assume always the same predetermined position relative to the horizontal.

I claim:

A bicycle pedal comprising a spindle, bearings adjacent the opposite ends of the spindle on which the remaining parts of the pedal structure are journalled, end plates journalled on the bearings, a pair of treads extending between and secured to opposite end plates and positioned on opposite sides of the spindle to be substantially in balance relative to the spindle; and a dust cap secured to the outer end plate, said dust cap having its center of gravity offset from the axis of the spindle to such an extent that, when the pedal structure is free to rotate on the spindle, the offset weight of the dust cap will cause the pedal structure to assume always the same predetermined position relative to the horizontal.

CHARLES A. PERSONS.